United States Patent [19]

Schneider et al.

[11] Patent Number: 5,161,352

[45] Date of Patent: Nov. 10, 1992

[54] HORSE BLANKET ADJUSTMENT DEVICE

[75] Inventors: Stanley K. Schneider, Gates Mill; Donald P. Schneider, Chesterland, both of Ohio

[73] Assignee: Schneider Saddlery Co., Inc., Mayfield Heights, Ohio

[21] Appl. No.: 757,240

[22] Filed: Sep. 10, 1991

[51] Int. Cl.$^5$ .............................................. B68C 5/00
[52] U.S. Cl. ...................................... 54/79.2; 119/143
[58] Field of Search ........................ 54/79, 81, 66, 67; 119/143

[56] References Cited

U.S. PATENT DOCUMENTS

| | | | |
|---|---|---|---|
| 658,894 | 10/1900 | Gordon | 54/79 |
| 725,931 | 4/1903 | Cleaver | 54/79 |
| 784,921 | 3/1905 | Clemetson et al. | 54/79 |
| 1,159,495 | 11/1915 | Hill | 54/79 |
| 1,612,945 | 1/1927 | Rieck | 54/79 |
| 4,955,182 | 9/1990 | Newman | 54/66 |

OTHER PUBLICATIONS

Schneider ad in Quarter Horse Journal, p. 173, dated Sep. 1990.

Primary Examiner—John J. Wilson
Assistant Examiner—Todd E. Manahan
Attorney, Agent, or Firm—Jones, Day, Reavis & Pogue

[57] ABSTRACT

An adjustment device for modifying the front of a horse blanket prevents the blanket from rubbing off hair and causing sores on the horse's shoulders and withers. The adjustment tabs are formed by sewing a first strip of hook and loop connecting material on each side of the outer facing of the blanket on a line positioned diagonally between the center of the chest and the top of the wither. A second strip of mating hook and loop connecting material is connected to the first strip. It passes through a rectangular loop and attaches back to the first strip. By pulling the second strip through the loop any desired amount, a pleat is formed in the blanket on each side of the horse on the slope of the shoulder approximately halfway between the point of the shoulder and the wither. The necessary overlap of material is confined high on the slope of the shoulder in an area that is relatively immobile and with an area of the blanket that is not subjected to significant strain, thus preventing the blanket from rubbing off hair and causing sores on the horse's shoulders and withers.

10 Claims, 1 Drawing Sheet

HORSE BLANKET ADJUSTMENT DEVICE

FIELD OF THE INVENTION

The present invention relates to an adjustment device for modifying the fit of the front of a horse blanket in general and specifically relates to an adjustment device for modifying the fit of the area of the blanket that covers the horse from the center of its chest to the top of its withers to prevent the blanket from rubbing off hair and causing sores on the horse's shoulders and withers.

BACKGROUND OF THE INVENTION

Blankets are used on horses to provide warmth during cold weather. Of necessity they tend to be bulky and heavy in weight. These blankets are fitted to horses according to overall length. The size of blanket to be used generally equates to or slightly exceeds the length of the horse with the length of the horse being the measurement from the center of the chest to the edge of his tail. Such blankets are manufactured in increments of two inches in popular sizes and four inches in less popular sizes.

Horses of identical overall length vary substantially in the muscular development of their chests, the width of their shoulders, and the height and width of their withers, specifically the distance from the center of their chests (where the blanket's neck opening begins) to the top of their withers (where the neck opening should end). Properly fitted, the front of the neck opening of the blanket should ride well above the points of the shoulders and the back of the neck opening should be at the top of the withers. This position enables the blanket to remain in a stable position relatively motionless as the horse moves.

If the neck opening of the blanket is too large for the horse, the front edge of the neck opening slips down to contact the points of the horse's shoulders. When the horse moves about, the movement of his shoulders causes the hair to be rubbed off and causes sores and further causes the blanket to rub back and forth on his withers causing the loss of hair, sores and in some cases severe galling which can disable the horse.

Often the neck opening fits adequately when the blanket is new but the strain placed on the front of the blanket by the horse continually putting his head down to eat and getting up from a reclining position tends to stretch out the front of most blankets causing them to sag and contact the horse at the points of the shoulders, thereby creating the rubbing and the sores.

Previous attempts to solve the problem involved lining the portion of the blanket that contacts the withers with sheepskin or foam inserts for protection of the withers. An anti-rub device, U.S. Pat. No. 4,955,182, is being marketed which provides for a protective undercover to protect the horse by preventing the blanket from rubbing hair off the horse's shoulders. This device is effective but it involves purchasing and using a second device in addition to the blanket.

Further, the size of the neck opening is made adjustable by the use of fasteners attached to the front of an open front style blanket. Open front blankets are those where the blanket front can be opened with the two sides of the front being typically joined by fasteners, either straps sewn on the two sides or interleaved through grommets. The straps may buckle or clasp as with surcingle hardware.

Open front blankets are in wide use. Their main purpose is to enable the blanket front to be opened so that it is unnecessary to slip the blanket on over the horse's head. Over the years, manufacturers have at various times attempted to offer adjustment of the neck opening by various methods which involve overlapping the two sides of the front and fastening them with straps or hardware.

These prior art methods have not been successful for a number of reasons. First, straps, whether made of leather or nylon or supplemented by elastic, have not held up well on the front of the blanket. There is too much strain and either the strap, the stitching, the grommet or the hardware breaks or wears out rapidly. Additionally, the fasteners are placed in a location which is convenient for the horses to bite at and tear.

Also, having the adjustment at the front always involves overlap of bulky blanket material at the shoulder which, when affected by movement, typically bunched up under the blanket and rubbed. Finally, having the adjustment in the front tended to pull the entire blanket forward and sometimes restricted the range of motion of the horse's neck. As the horse put his head down to eat, he would pull the entire blanket forward which caused it to destabilize and shift.

The present invention overcomes the disadvantages of the prior art by providing an adjustment tab formed by sewing on each side of the outer facing of the blanket on a line positioned diagonally between the center of the chest and the top of the wither a six inch strip of connecting material such as loop material sold under the trademark VELCRO to which is connected a six inch strip of mating connecting material such as hook material sold under the trademark VELCRO. A loop is attached to the blanket on the diagonal line in spaced relationship with the strips of hook and loop material. A first of the strips, being connected to the end of the other strip, can pass through the loop and attach itself to the other at various lengths to adjust the fit of the blanket to the horse. This adjustment provides a method of reducing the size of the neck opening by causing a pleat to be taken on each side of the slope of the shoulder approximately halfway between the point of the shoulder and the wither. This adjustment lifts the front of the blanket and enables the front edge of the neck opening to float safely above the point of the shoulder, thereby eliminating rubbing at the shoulders and rubbing at the withers. By causing the pleat to be taken on each side of the horse high on the slope of the shoulder, the necessary overlap of material is confined to an area that is relatively immobile and an area of the blanket that is not subjected to significant strain. Further, this arrangement enables the adjustment device to be placed in an area where the horse cannot bite or chew on it. Also, the adjustment lifts the front of the blanket without disturbing the fit on the horse's back, thereby insuring the stability of the fit on the horse's back.

Because the connecting strips are adjustable with respect to each other, the user can readjust the blanket as the front stretches out from normal wear. Additionally, the adjustment of the present invention enables the blanket to adjust down two sizes (four inches) to fit young horses and enable the blanket to be adjusted to them as they grow. Finally, the adjustment of the present invention enables blankets to be manufactured in closed front style where the two sides of the front are sewn closed for greater durability and yet can be adjusted.

Thus it is an object of the present invention to provide an adjustment tab for a horse blanket which reduces the size of the neck opening by taking a pleat on each side of the blanket high on the slope of the shoulder approximately one-half the distance between the point of the shoulder and the wither.

It is also an object of the present invention to provide a horse blanket adjustment that lifts the front of the blanket and enables the front edge of the neck opening to float safely above the point of the shoulder, thereby eliminating rubbing at the shoulder and rubbing at the withers.

It is still another object of the present invention to provide an adjustment for a horse blanket which confines the necessary overlap of material high on the slope of the shoulder, an area that is relatively immobile and an area of the blanket that is not subjected to significant strain.

It is also an object of the present invention to provide an adjustment for a horse blanket which places the adjustment device in an area where the horse cannot bite or chew it.

Still another object of the present invention is to provide an adjustment for a horse blanket that lifts the front of the blanket without disturbing the fit on the horse's back thereby insuring the stability of fit on the horse's back.

Yet another object of the present invention is to provide an adjustment for a horse blanket which enables a user to readjust the blanket as the front of the blanket stretches out from normal wear.

It is yet another object of the present invention to provide an adjustment for a horse blanket that enables the blanket to adjust down two sizes to fit young horses and for adjustment as they grow.

Finally, it is an object of the present invention to provide an adjustment for a horse blanket that enables blankets manufactured in closed front style, blankets where the two sides of the front are sewn closed for better durability, to be adjusted.

SUMMARY OF THE INVENTION

Thus it is an object of the present invention to provide an improved blanket for a horse, the blanket having a neck opening and which extends down each of the sides of the horse and that has a length that equals or slightly exceeds the length of the horse, the improved blanket comprising an adjustment device attached to the blanket on each side of the outer facing of the blanket, the device being positioned on the upper slope of each shoulder on a line extending diagonally between the center of the chest and the top of the withers for causing the fit of the blanket to be adjusted to the shape of the horse and prevent the blanket from rubbing off hair and causing sores on the shoulders and withers of the horse.

The invention also relates to a method of improving the fit of a blanket to a horse, the blanket extending down each side of the horse and having a length that equals or exceeds the length of the horse as measured from the center of the chest to the edge of the tail, the method comprising the steps of taking a pleat on each side of the blanket on a line positioned diagonally between the center of the chest and the top of the withers such that each pleat is in the upper portion of the slope of each shoulder, thereby confining the overlap portion of the pleat in an area that is relatively immobile and where the blanket is subjected to insignificant strain.

BRIEF DESCRIPTION OF THE DRAWINGS

These and other objects of the present invention will be more readily apparent and when taken in conjunction with the detailed specification and the drawings in which like numerals represent like elements and in which.

DETAILED DESCRIPTION OF THE DRAWINGS

Figure 1:
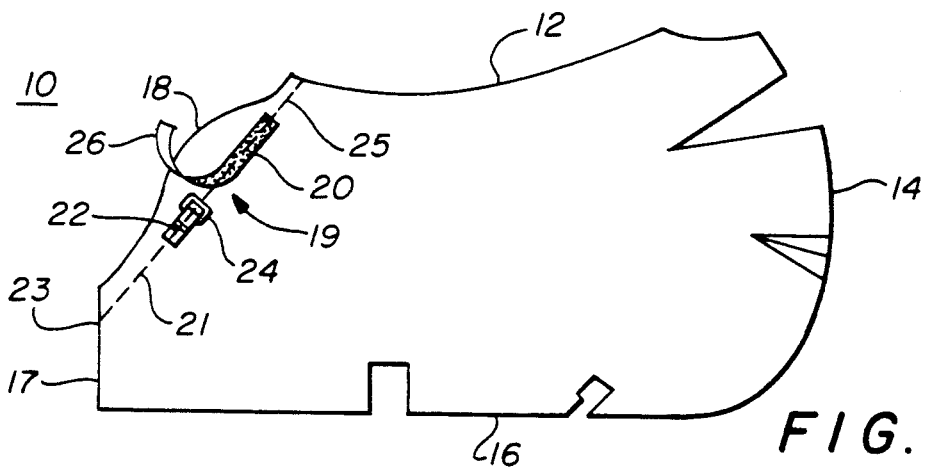
FIG. 1 is a plan view of one-half of the horse blanket of the present invention.

FIG. 1 is a plan view of the blanket diagram of the blanket of the present invention including the novel adjustment device. The blanket is generally designated by the numeral 10 and has an upper portion 12 that would be attached to a corresponding upper portion of the upper half of the blanket, a rear portion 14 and a lower portion 16 which extends down the sides of the horse. The front portion 17 of each half, when attached together such as by sewing, forms a blanket of the closed front style where the two edges 17 are sewn closed as of 32 for greater durability. The portion 18 runs from the chest of the horse to the top thereof at the base of the neck 30. The novel adjustment device 19 includes a first strip 20 of connecting material sewn to the blanket on a line 21 that is positioned diagonally between the center of the chest 23 and the top of the withers 25. A strap 22 is secured to the blanket and has a loop 24 attached to the loop. The loop 24 may be a buckle, a nylon loop or the like. The loop 24 is in line with and in spaced relationship from the first connecting strip 20. A second strip 26 of mating connecting materials is connected to the end of the first strip 20 such that the second strip 26 can pass through the loop 24 and attach to the first strip 20 at various lengths to adjust the fit of the blanket to the horse. It can be seen in FIG. 1 that the adjustment device 19 is positioned on the blanket such that it will be on the slope of the shoulder of the horse approximately halfway between the point of the shoulder and the withers.

Figures 2, 3, 4:
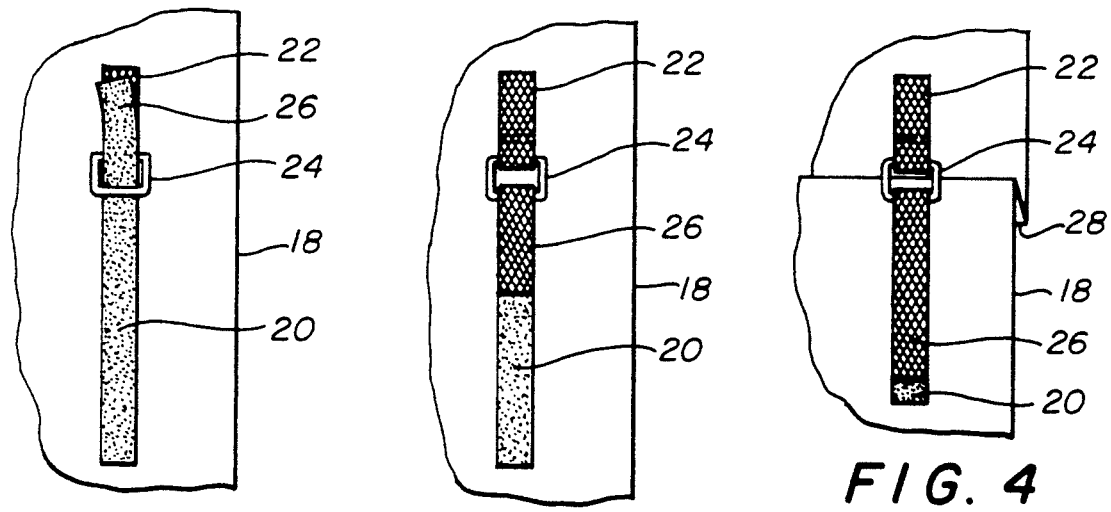
FIG. 2 is a schematic representation of a portion of the blanket containing the adjustment device with the adjustment device in the open position.
FIG. 3 is a schematic representation of a portion of the blanket containing the adjustment device in which the adjustment device is closed but not adjusted.
FIG. 4 is a schematic representation of the portion of the horse blanket containing the adjustment mechanism with the adjustment mechanism in an adjusted position to cause a crease or pleat in the blanket.

FIG. 2 is a partial schematic view of the blanket with the adjustment device 19 in the open, unadjusted position. Thus the connecting strip 26 has passed through the loop 24 but is not attached at any point to the mating connecting strip 20. In FIG. 3, the strip 26 is shown passed through the loop 24 and is folded back over the mating connecting strip 20 but is not in any adjusted position.

FIG. 4 is a schematic representation of the adjusting device in the adjusted position. As can be seen in FIG. 4, the strip 26 has been pulled tight through loop 22 and attached to the mating strip 20. Thus the loop 22 and the strip 20 are moved closer to each other, thus causing a pleat 28 or fold in the blanket being adjusted. As stated earlier, this overlap of material is high on the slope of the shoulder of the horse, an area that is relatively immobile and an area of the blanket that is not subjected to significant strain.

Figures 5, 6:
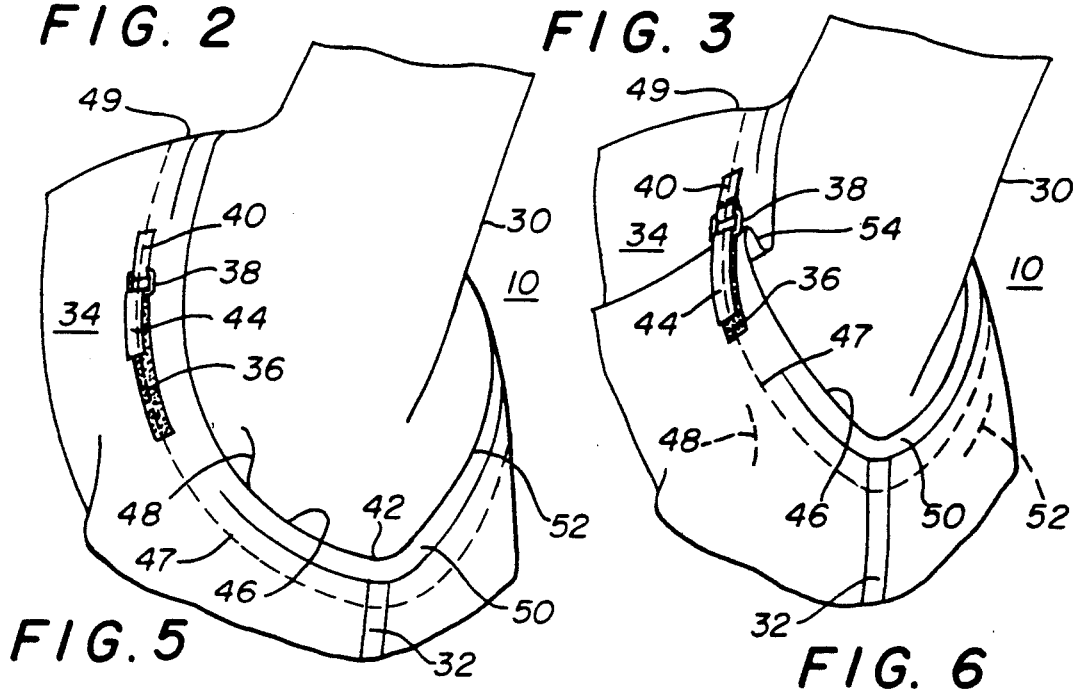
FIG. 5 is a representation of a horse blanket of the closed front style on a horse with the tab open and not adjusted and illustrating the blanket riding below and on the shoulder.
FIG. 6 is a diagrammatic representation of the closed front blanket on the horse with the adjustment device adjusted to create a pleat in the blanket and move the blanket up and over the shoulder.

FIG. 5 is an illustration of a closed front blanket 34 on a horse with the novel adjusting device thereon. As can be seen in FIG. 5, the adjusting device includes the connecting strip 44 which has been pulled through the loop 38 but has not been adjusted to pull the loop 38 towards the spaced connecting strip 36. Note in FIG. 5 that the front portions 46 and 50 of the neck opening 42 is on the points 48 and 52 of the shoulders of the horse. When the horse moves, the movement of his shoulders at 48 and 52 causes the hair to be rubbed off his shoulders and causes sores. Further, the blanket is caused to rub back and forth on the withers 49 of the horse causing loss of hair, soring and in some cases severe galling. Using the novel adjusting device, however, this condition can be corrected as illustrated in FIG. 6. As can be seen in FIG. 6, the strip 44 is pulled through loop 38 sufficiently tight to pull the loop 38 towards the mating connecting strip 36, thus causing a pleat or fold 54 in the blanket which is high on the slope of the shoulder approximately halfway between the point of the shoulder 48 and the wither. Notice that the edge 46 of the blanket is now well above the point 48 and 52 of the shoulders. Note in both FIGS. 5 and 6 that the attachment strip 40 is in alignment with the mating connecting strip 36 and that both of them lie on a line 47 positioned diagonally between the center of the chest and the top 49 of the wither. Since both sides of the blanket are constructed the same, only one side is shown in both FIGS. 5 and 6. Thus the adjustment as shown in FIG. 6 lifts the front portions 46 and 50 of the blanket upwardly and enables the front edge of the neck opening to float safely above the point 48 and 52 of the shoulder, thereby eliminating rubbing at the shoulder and rubbing at the withers. Further, as stated, the necessary overlap of material 54 is high on the slope of the shoulder which is an area that is relatively immobile and an area of the blanket that is not subjected to significant strain. Further, it can be clearly seen that in the position shown, the device is in an area where the horse cannot bite or chew it. Also, since the pleat is formed by pulling the strip 44 through the loop 38 and attaching it to the mating connecting strip 36, the front areas 46 and 50 of the blanket are lifted without disturbing the fit on the horse's back, thereby insuring the stability of fit of the blanket on the horse's back.

It can be readily understood that the strip 44 can be pulled as much as or as little as necessary through loop 38 to provide the proper adjustment. This enables the user to readjust the blanket as the front stretches out from normal wear. It also enables the blanket to be adjusted at least two sizes smaller to fit young horses and then be adjusted to continue to fit them as they grow. Also, the novel adjusting device enables blankets manufactured in closed front style as shown in FIGS. 5 and 6 which provides greater durability for the blanket and still provides adjustability.

Thus there has been disclosed a novel adjustment device or tab formed by sewing on each side of the outer facing of the blanket on a line positioned diagonally between center of the chest and the top of the wither a first six inch strip of connecting material to which is connected a second six inch strip of a mating connecting material which can pass through a rectangular loop and attach back to the first strip. This adjustment tab provides a method of reducing the size of the neck opening by taking a pleat on each side which is high on the slope of the shoulder of the horse, approximately halfway between the point of the shoulder and the wither.

The device lifts the front of the blanket and enables the front edge of the neck opening to float safely above the point of the shoulder, thereby eliminating rubbing at the shoulder and rubbing at the withers. Further, the novel device confines the necessary overlap of material to form the pleat high on the slope of the shoulder which is an area that is relatively immobile and an area of the blanket that is not subjected to significant strain. The novel device is placed in an area on the blanket where the horse cannot bite or chew it. It also lifts the front of the blanket during adjustment without disturbing the fit on the horse's back, thereby insuring the stability of the blanket fit on the horse's back.

The device enables the user to readjust the blanket as the front of the blanket stretches out from normal wear and also enables the blanket to be adjusted down at least two sizes to fit young horses as they grow. The novel device can be used on closed front or open front style blankets with equal reliability. The use with closed front style blankets where the two sides of the front of the blanket are sewn together provides greater durability.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. An improved blanket for a horse, the blanket having a neck opening and sides which extend down each of the sides of the horse and that has a length that equals or slightly exceeds the length of the horse, the improvement comprising:

first and second adjustment devices attached to the blanket on each side of the outer facing of the blanket, said devices being adjustable towards each other and positioned on the upper slope of each shoulder on a line positioned diagonally between the center of the chest and the top of the withers for forming a pleat to adjust the fit of the blanket to the shape of the horse and preventing the blanket from rubbing off hair and causing sores on the shoulders and withers of the horse.

2. An improved blanket as in claim 1 wherein each of the adjustment devices are first and second flexible tabs sewn to the blanket that adjust position with respect to each other for taking the pleat in the blanket on each side of the horse on the slope of the shoulders approximately halfway between the point of the shoulder and the withers.

3. An improved horse blanket as in claim 2 wherein the tabs comprise:

a first strip of hook and loop connecting material sewn to the blanket on said line;

a loop attached to the blanket on said line in spaced relationship with said strip of connecting material; and a second strip of mating connecting material connected to the end of said first strip such that the second strip can pass through said loop and attach to the first strip at various points to form the pleat and adjust the fit of the blanket to the horse.

4. A method of improving the fit of a blanket to a horse, the blanket extending down each side of the horse and having a length that equals or exceeds the length of the horse as measured from the center of the chest to the edge of the tail, the method comprising the steps of:

taking a pleat on each side of the blanket on a line positioned diagonally between the center of the chest and the top of the withers such that each pleat is on the upper portion of the slope of each shoulder thereby confining the overlapped portion of the pleat in an area that is relatively immobile and where the blanket is subjected t insignificant strain.

5. A method as in claim 4 wherein the step of taking a pleat comprises the steps of:

attaching first and adjustment devices to the blanket on each side of the outer facing of the blanket, said devices being positioned on the upper slope of each shoulder on a line positioned diagonally between the center of the chest and the top of the withers for causing the fit of the blanket to adjust to the shape of the horse and prevent the blanket from rubbing off hair and causing sores on the shoulders and withers of the horse.

6. A method as in claim 5 further comprising the step of forming each of the adjustment devices as first and second flexible tabs sewn to the blanket that adjust position with respect to each other for taking the pleat in the blanket on each side of the horse on the slope of the shoulder approximately halfway between the point of the shoulder and the withers.

7. A method as in claim 6 further comprising the steps of:

sewing a first strip of hook and loop connecting material to the blanket on said line;

attaching a loop to the blanket on said line in spaced relationship with said first strip; and connecting a second strip of mating hook and loop connecting material to the end of said first strip such that the second strip can pass through said loop and attach to the first strip at various points to adjust the fit of said blanket to said horse.

8. A method of fitting a blanket to a horse, the blanket having a neck opening and extending down each side of the horse and having a length equal to or exceeding the length of the horse, the length of the horse being the measurement from the center of the chest to the edge of the tail, the method comprising the steps of:

taking a pleat in the blanket on each side of the horse to lift the front of the blanket and enable the front edge of the neck opening to float above the upper point of the shoulder so as to eliminate rubbing at the shoulder and rubbing at the withers; and confining the overlap of material in the pleat in an upper area of the shoulder that is relatively immobile and in an area of the blanket that is not subject to significant strain.

9. A method of fitting a blanket to a horse, the blanket having a neck opening and extending down each side of the horse and having a length equal to or exceeding the length of the horse, the length of the horse being the measurement from the center of the chest to the edge of the tail, the method comprising the steps of:

placing an adjustable device on the blanket on each side of the horse in an area where the horse cannot bite or chew it; and adjusting each of the devices to lift the front of the blanket without disturbing the fit of the blanket on the horse's back, thereby incurring the stability of proper fit of the blanket on the horse's back.

10. A method as in claim 9 further comprising the steps of readjusting the adjustment device to maintain the proper fit as the blanket stretches for normal wear.

* * * * *